(12) United States Patent
Shirakawa et al.

(10) Patent No.: US 12,487,103 B2
(45) Date of Patent: Dec. 2, 2025

(54) POSITION DETECTION DEVICE

(71) Applicant: Proterial, Ltd., Tokyo (JP)

(72) Inventors: Yohei Shirakawa, Tokyo (JP); Yuta Sugiyama, Tokyo (JP); Yoshiaki Yanagisawa, Tokyo (JP); Yoshitake Ageishi, Tokyo (JP); Yukio Ikeda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 235 days.

(21) Appl. No.: 18/491,352

(22) Filed: Oct. 20, 2023

(65) Prior Publication Data

US 2024/0142277 A1    May 2, 2024

(30) Foreign Application Priority Data

Oct. 26, 2022 (JP) .................. 2022-171655

(51) Int. Cl.
*G01D 5/20* (2006.01)
(52) U.S. Cl.
CPC .................... *G01D 5/204* (2013.01)
(58) Field of Classification Search
CPC ........ G01D 5/20; G01D 5/204; G01D 5/2053; G01B 7/00; B62D 15/0225
See application file for complete search history.

(56) References Cited

U.S. PATENT DOCUMENTS

2024/0019276 A1\* 1/2024 Berner ................ G01D 5/2073

FOREIGN PATENT DOCUMENTS

JP          2009-002770 A      1/2009
WO     WO-2021079899 A1 \*  4/2021   ............... G01D 5/20

\* cited by examiner

*Primary Examiner* — Son T Le
(74) *Attorney, Agent, or Firm* — Studebaker Brackett PLLC

(57) ABSTRACT

A position detection device detects a position of a moving member moving backward and forward in a predetermined moving direction. The position detection device includes an exciting coil disposed along the moving member and extending in the moving direction, a detection coil that outputs a voltage corresponding to a position of a detection target portion moving with the moving member by means of a magnetic field generated by the exciting coil within a predetermined detection range in the moving direction, and a calculation unit that calculates the position of the moving member by the output voltage of the detection coil. The detection coil includes a pair of coil elements whose output voltage changes according to the position of the moving member, and phases of the output voltages of the pair of coil elements during movement of the moving member within the detection range differ from each other.

7 Claims, 11 Drawing Sheets

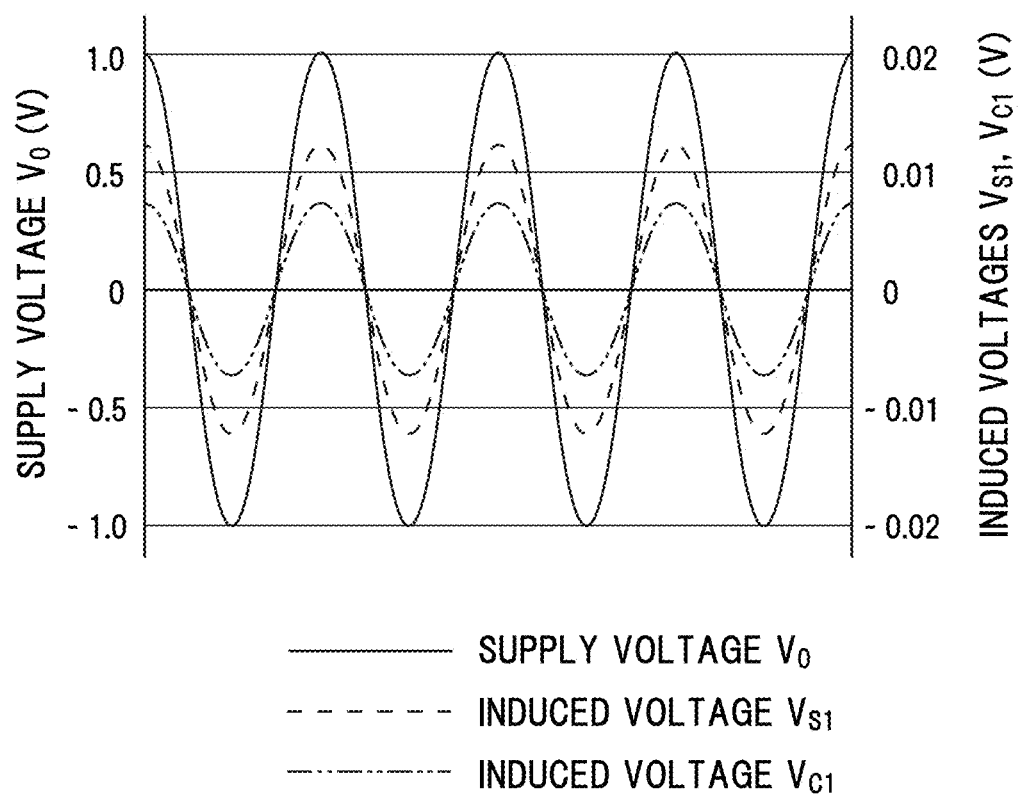

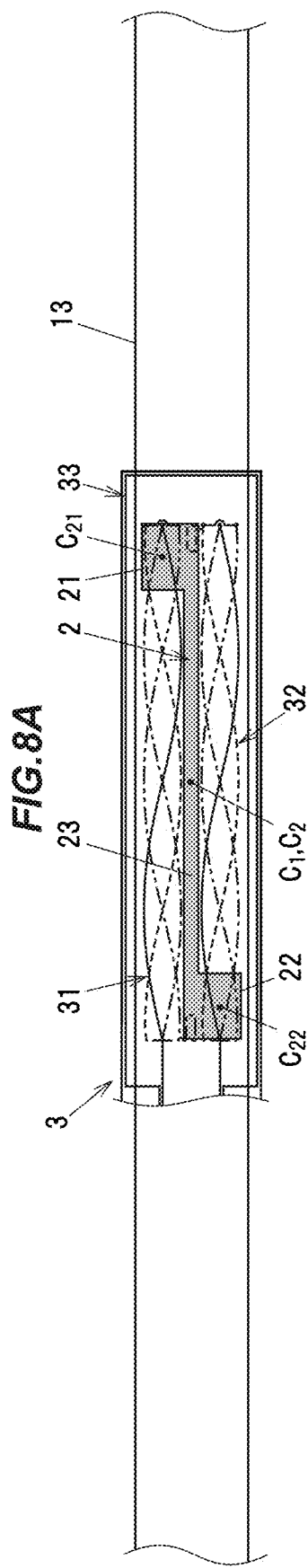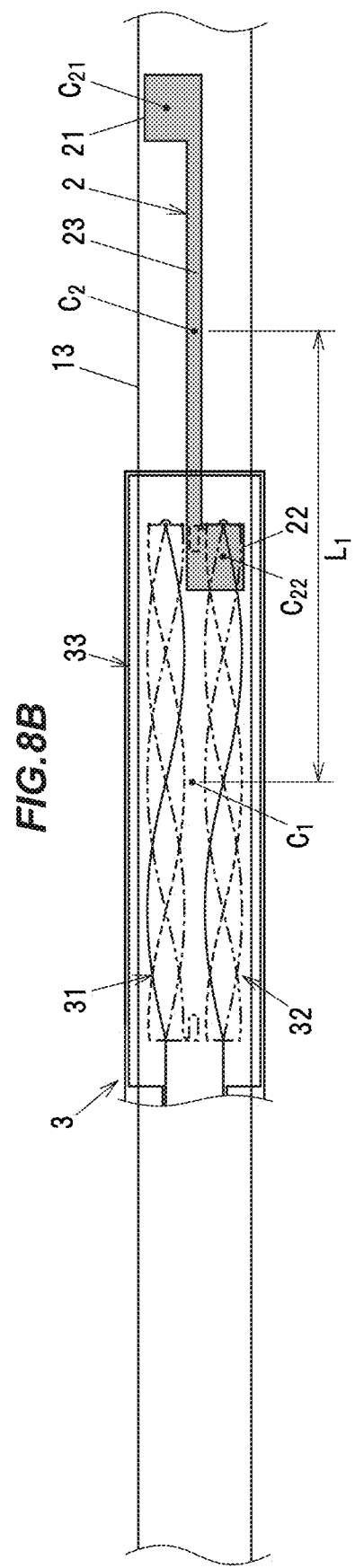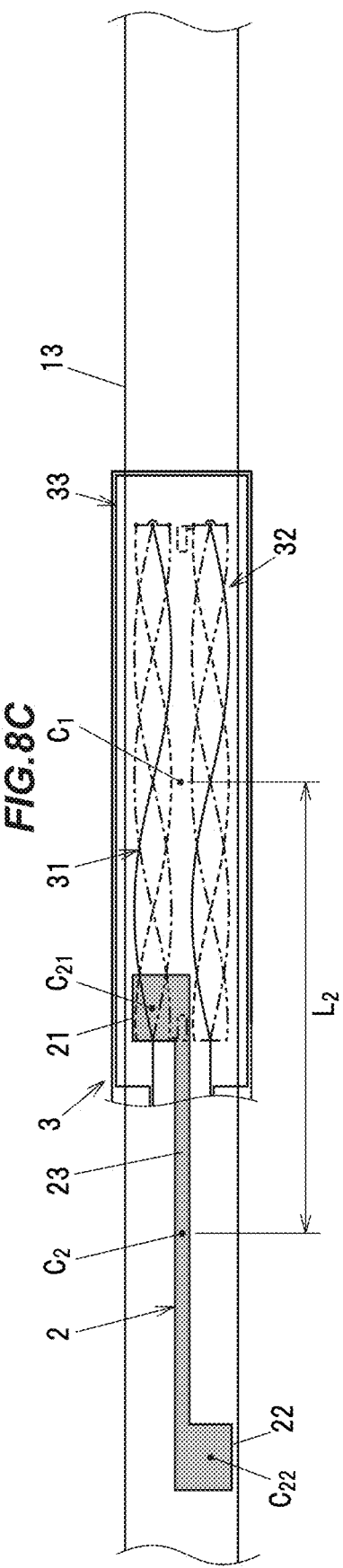

POSITION DETECTION DEVICE

CROSS-REFERENCE TO RELATED APPLICATIONS

The present application is based on Japanese patent application No. 2022-171655 filed on Oct. 26, 2022, the entire contents of which are incorporated herein by reference.

TECHNICAL FIELD

The present invention relates to a position detection device that detects the position of a moving member that moves forward and backward in a predetermined direction of movement.

BACKGROUND OF THE INVENTION

Conventional position detection devices that detect the position of a moving member moving forward and backward (i.e., reciprocating) in a predetermined direction of movement are used in various fields such as industrial machinery and automobiles.

The electromagnetic induction type linear scale described in Patent Literature 1 has a coil array comprising a predetermined number of coil elements excited by a first AC signal, a magnetic member that is relatively displaced outside the coil array along its axis, and a detection unit that detects the position of the magnetic member relative to the coil array from the output voltage of each coil element. The magnetic member changes the amplitude of the output voltage of the coil elements according to its position relative to the coil elements. The detection unit detects the relative position of the magnetic member with respect to the coil array in an absolute manner from the phase difference between the second AC signal and the first AC signal obtained by synthesizing the differential output between the coil elements.

CITATION LIST

Patent Literature 1: JP2009-2770A

SUMMARY OF THE INVENTION

In the electromagnetic induction type linear scale described in Patent Literature 1, a large number of coil elements must be arranged side by side over the entire range of movement of the magnetic member, which increases the installation size and weight. Therefore, the object of the present invention is to provide a position detection device that can be reduced in size and weight.

For the purpose of solving the above problem, one aspect of the present invention provides a position detection device configured to detect a position of a moving member moving backward and forward in a predetermined moving direction, comprising:
- an exciting coil disposed along the moving member extending in the moving direction;
- a detection coil that outputs a voltage corresponding to a position of a detection target portion moving with the moving member by means of a magnetic field generated by the exciting coil within a predetermined detection range in the moving direction; and
- a calculation unit that calculates the position of the moving member by the output voltage of the detection coil, wherein the detection coil includes a pair of coil elements whose output voltage changes according to the position of the moving member, and phases of the output voltages of the pair of coil elements during movement of the moving member within the detection range differ from each other, and wherein at least any coil element of the pair of coil elements includes a main coil portion that generates a voltage according to the position of the detection target portion by a magnetic field generated by the exciting coil when the position of the detection target portion is within the detection range, and a sub coil portion that generates a voltage by the magnetic field generated by the exciting coil when the position of the detection target portion is outside the detection range.

Advantageous Effects of the Invention

According to the present invention, it is possible to reduce the size and weight of the position detection device.

BRIEF DESCRIPTION OF DRAWINGS

FIG. 6 is a graph showing an example of the relationship between the supply voltage supplied from a power supply unit to an exciting coil and the induced voltage induced in a first sine wave-shaped coil element of a first detection coil and the induced voltage induced in a first cosine wave-shaped coil element of the first detection coil.

FIGS. 8A to 8C are explanatory diagrams showing relative positional relationships of the first and second detection coils and the first and second targets.

DETAILED DESCRIPTION OF THE INVENTION

Embodiment

Figure 1:
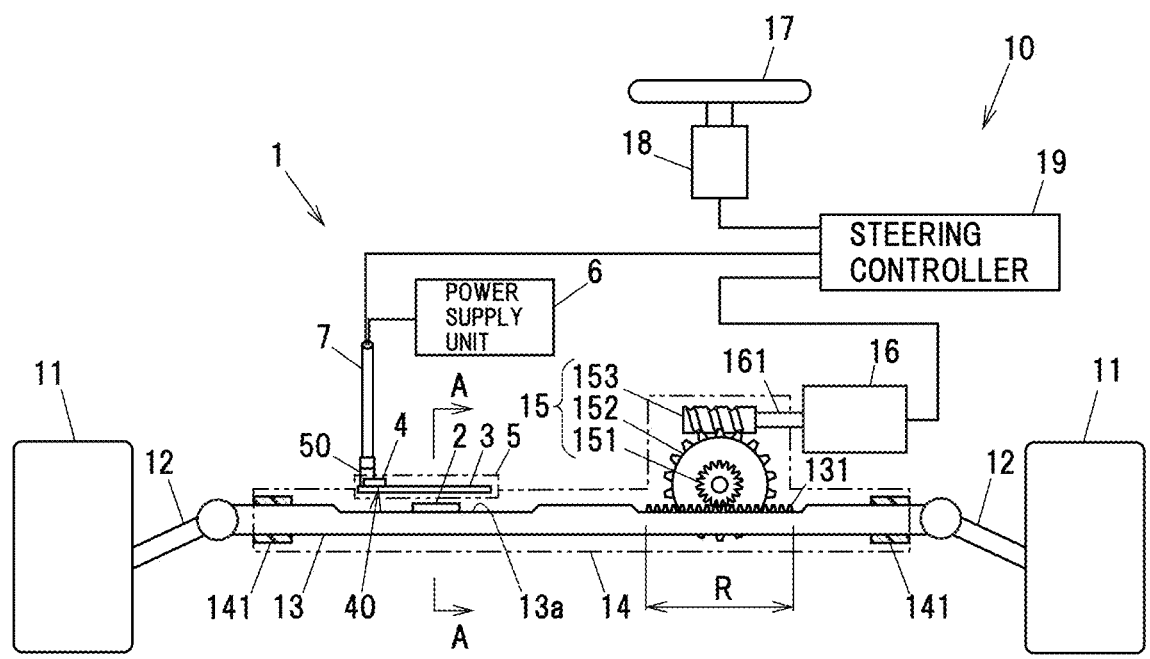
FIG. 1 is a schematic diagram of a vehicle equipped with a steer-by-wire steering system with a stroke sensor as a position detection device according to an embodiment of the present invention.

FIG. 1 is a schematic diagram of a vehicle equipped with a steer-by-wire steering system 10 with a stroke sensor 1 as a position detection device according to an embodiment of the present invention. In FIG. 1, the steering device 10 is viewed from the rear side in a vehicle front-rear direction, the right side of the drawing corresponds to the right side in a vehicle width direction, and the left side of the drawing corresponds to the left side in the vehicle width direction. The terms "right" and "left" are sometimes used in the following description with reference to the drawings, but this expression is used for convenience of explanation and does not limit the direction of arrangement when the stroke sensor 1 is actually in use.

As shown in FIG. 1, the steering device 10 includes the stroke sensor 1, tie rods 12 connected to steered wheels 11 (left and right front wheels), a rack shaft 13 connected to the tie rods 12, a housing 14 that houses the rack shaft 13, a worm speed reduction mechanism 15 having a pinion gear 151 meshed with rack teeth 141 of the rack shaft 13, an electric motor 16 that applies a moving force in a vehicle width direction to the rack shaft 13 through the worm speed reduction mechanism 15, a steering wheel 17 operated by a driver, a steering angle sensor 18 to detect a steering angle of the steering wheel 17, and a steering controller (i.e., steering control device) 19 that controls the electric motor 16 based on the steering angle detected by the steering angle sensor 18.

The rack shaft 13 is a moving member whose position relative to the housing 14 is detected by the stroke sensor 1. A moving direction of the rack shaft 13 is an axial direction parallel to a central axis of the rack shaft 13.

In FIG. 1, the housing 14 is indicated by a phantom line. The rack shaft 13 is supported by a pair of rack bushings 141 attached to both ends of the housing 14. The worm speed reduction mechanism 15 has a worm wheel 152 and a worm gear 153, and the pinion gear 151 is fixed to the worm wheel 152. The worm gear 153 is fixed to a motor shaft 161 of the electric motor 16.

The electric motor 16 generates torque by a motor current supplied from the steering controller 19 and rotates the worm wheel 152 and the pinion gear 151 through the worm gear 153. When the pinion gear 151 rotates, the rack shaft 13 linearly moves back and forth along the vehicle width direction. The rack shaft 13 can move to the right and left in the vehicle width direction within a predetermined range from a neutral position at which the steering angle is zero.

In FIG. 1, a double-headed arrow indicates a stroke range R that corresponds to the maximum travel distance of the rack shaft 13 when the steering wheel 17 is operated from one of the left and right maximum steering angles to the other maximum steering angle. The stroke sensor 1 can detect the absolute position of the rack shaft 13 relative to the housing 14 over the entire stroke range R.

(Configuration of Stroke Sensor 1)

A stroke sensor 1 includes a target 2 which is made of an electrically conductive member and is attached to the rack shaft 13, a substrate 3 arranged to face the target 2, a calculation unit 40 composed of a CPU (arithmetic processing unit) 4 mounted on the substrate 3, a case member 5 having a connector 50, a power supply unit 6 for generating a radio frequency (i.e., high frequency) voltage, and a cable 7 for connecting the connector 50 mounted on the case member 5 to the power supply unit 6 and the steering controller 19. The substrate 3 is housed in the case member 5 and positioned parallel to the rack shaft 13, and the substrate 3 is fixed to the housing 14 in a non-movable manner.

The stroke sensor 1 detects a position of the rack shaft 13 in an axial direction (movement direction) with respect to the housing 14, and outputs detected position data to the steering controller 19. The steering controller 19 controls the electric motor 16 in such a manner that the position of the rack shaft 13 detected by the stroke sensor 1 will be a position corresponding to a steering angle of the steering wheel 17 detected by the steering angle sensor 18.

Figure 2:
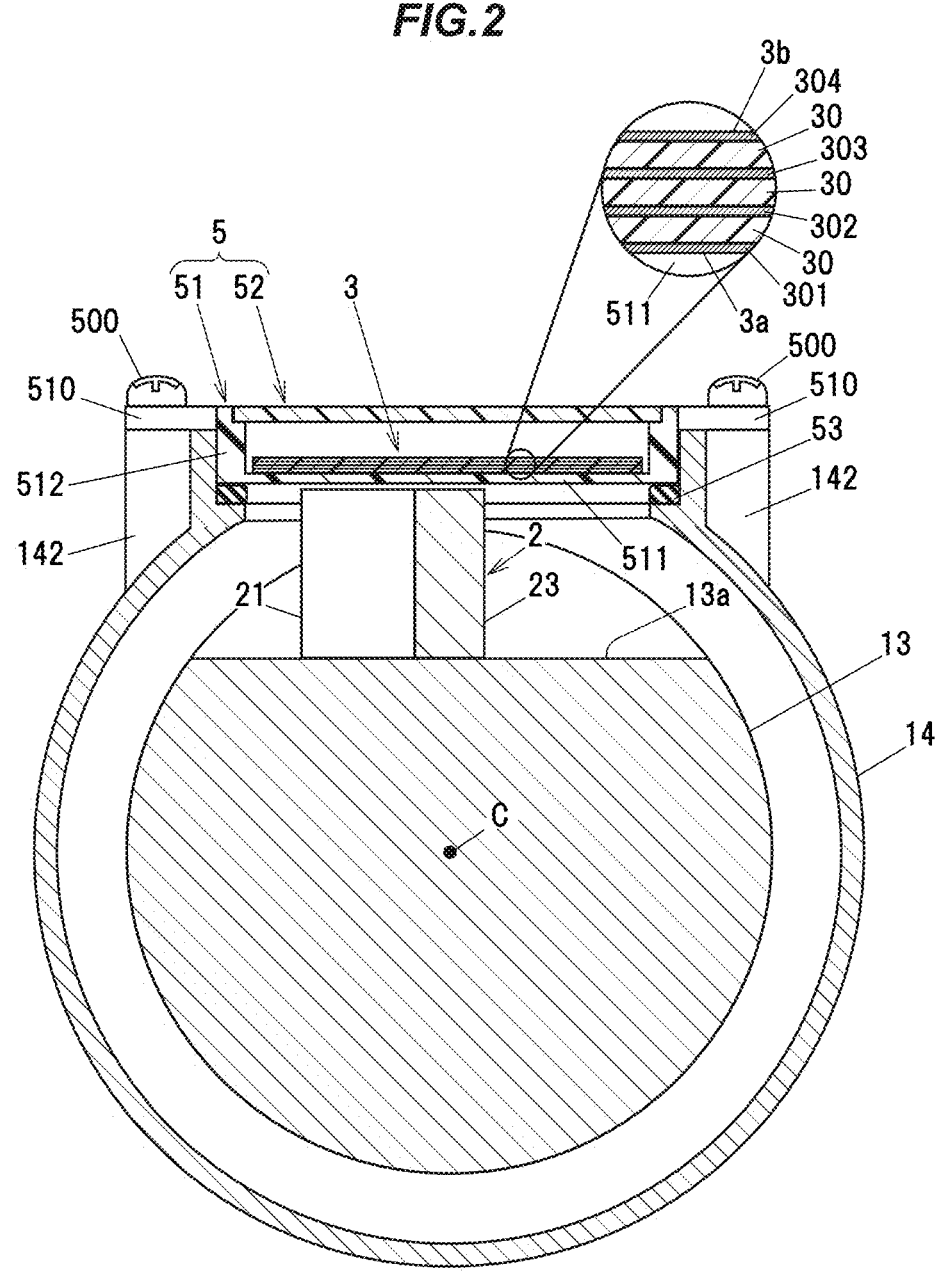
FIG. 2 is a cross-sectional view of FIG. 1 taken along a line A-A.
Figure 3:
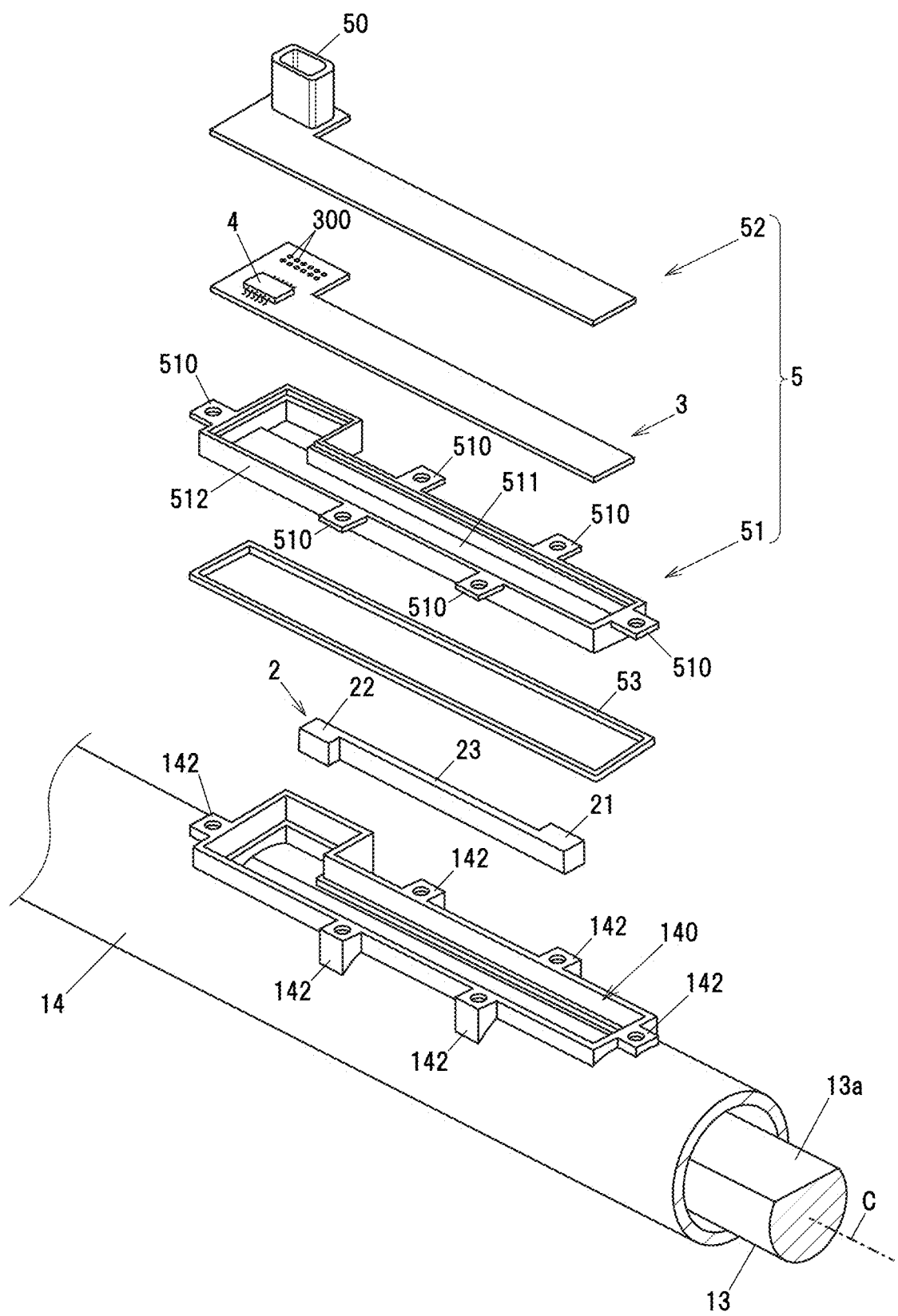
FIG. 3 is a perspective view showing a target, a substrate, a CPU, a case member, a rack shaft, and a part of a housing.

FIG. 2 is a cross-sectional view of FIG. 1 taken along a line A-A. FIG. 3 is a perspective view showing the target 2, the substrate 3, the CPU 4, the case member 5, the rack shaft 13, and a part of the housing 14.

The rack shaft 13 is a rod (i.e., bar-shaped body) made of steel, for example, carbon steel for machine structural use. The housing 14 is, e.g., made of a die cast aluminum alloy having a tubular shape. The housing 14 has an opening 140 opening vertically upward, and the case member 5 is attached to the housing 14 to close the opening 140.

The target 2 has two detection target portions (i.e., portions to be detected) 21, 22 for detecting the position of the rack shaft 13, and a linear portion 23 extending parallel to the axial direction of the rack shaft 13 in one piece (i.e., integrally). In other words, in the present embodiment, the two detection target portions 21, 22 are formed by the target 2. The two detection target portions 21, 22 are provided at different axial positions along the central axis C of the rack shaft 13. The linear portion 23 connects the two detection target portions 21, 22. The material of the target 2 desirably has a high electrical conductivity, for example, aluminum alloy or copper alloy can be suitably used.

The target 2 is mounted on the rack shaft 13, and the two detection target portions 21, 22 and the linear portion 23 move with the rack shaft 13. The rack shaft 13 has a flat mounting surface 13a for mounting the target 2, and the target 2 is fixed to the mounting surface 13a by welding, for example. The shaft material of the rack shaft 13 may be machined to form the detection target portions 21, 22.

The case member 5 has a case body 51, and a case lid 52. The case body 51 has a plurality of fixing portions 510 for fixing to the housing 14, and the fixing portions 510 are fixed to a fixing target portion 142 in the housing 14 by bolts 500 (see FIG. 2). A packing 53 is disposed between the case body 51 and the housing 14 to prevent moisture from entering through the opening 140 of the housing 14. The case body 51 and the case lid 52 are made of, e.g., resin material as an insulator, but one or both of the case body 51 and the case lid 52 may be conductors.

The case body 51 has a bottom plate 511 facing a front surface 3a of the substrate 3, and a circumferential wall 512 provided around the bottom plate 511. The substrate 3 is disposed between the bottom plate 511 and the case lid 52 of the case body 51. The case lid 52 is fixed to an open end of the circumferential wall 512, e.g., by adhesion. The connector 50 is attached to the case lid 52.

The substrate 3 is a four-layered substrate in which flat plate-shaped base materials 30 made of a dielectric such as FR4 (glass fiber impregnated with epoxy resin and heat-cured) are arranged between first to fourth metal layers 301 to 304. A thickness of each base material 30 is, e.g., 0.3 mm. The first to fourth metal layers 301 to 304 are made of, e.g., copper and each have a thickness of, e.g., 18 μm. The substrate 3 has a flat rectangular shape whose long side direction (longitudinal direction) coincides with the moving direction of the rack shaft 13. The substrate 3 is not limited to a rigid substrate and may be a flexible substrate.

Figure 4A:
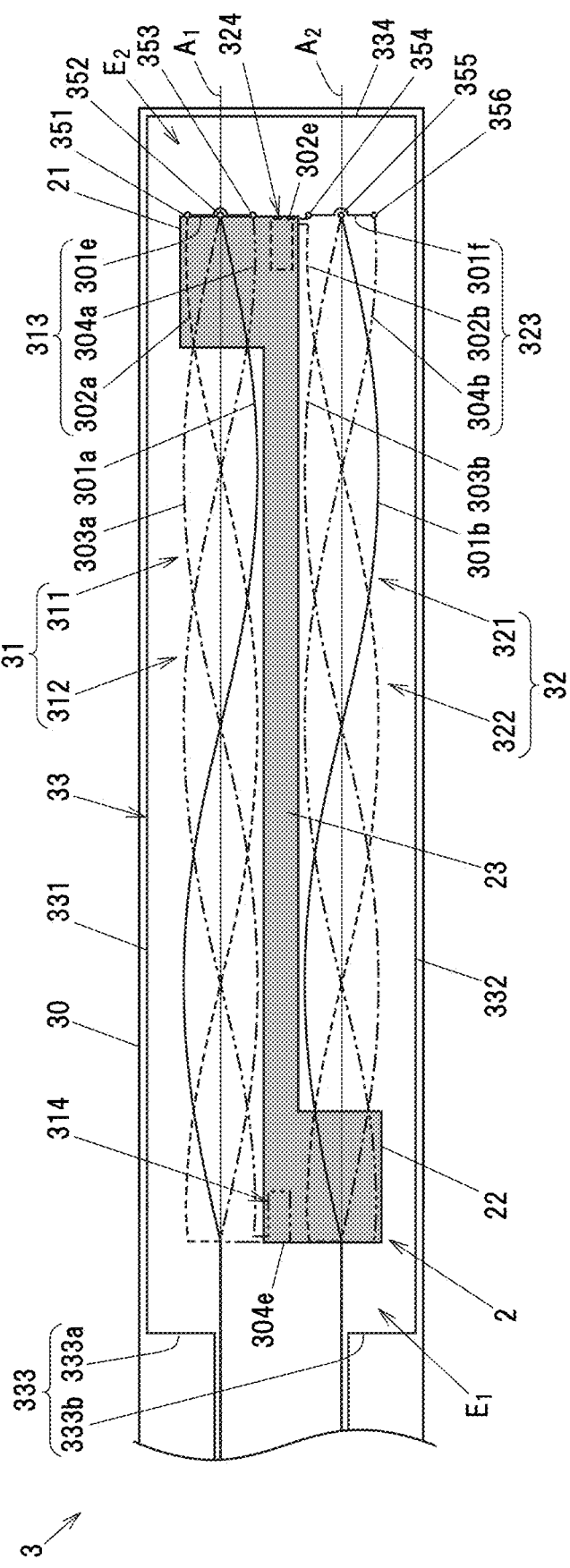
FIG. 4A is an overall view of wiring patterns formed in the first to fourth metal layers of the substrate, viewed in perspective.

FIG. 4A is an overall view in which wiring patterns formed on the first to fourth metal layers 301 to 304 of the substrate 3 are seen through from a back surface 3b-side. FIGS. 4A and 4B are a partial enlarged views of FIG. 4A. FIGS. 5A to 5D are plan views respectively showing the first to fourth metal layers 301 to 304 as viewed from the back surface 3b-side.

In FIGS. 4A to 4C and 5A to 5D, the wiring pattern of the first metal layer 301 is indicated by solid lines, the wiring pattern of the second metal layer 302 is indicated by dashed lines, the wiring pattern of the third metal layer 303 is indicated by dashed-dotted lines, and the wiring pattern of the fourth metal layer 304 is indicated by dashed-double-dotted lines. The wiring patterns shown in FIGS. 4A to 4C and 5A to 5D are merely examples, and various forms of wiring patterns can be employed as long as the substrate 3 is formed so that the effects of the invention can be obtained.

The substrate 3 has a plurality of through-holes 300 (see FIG. 3) for connecting the terminals of the connector 50, and first to sixth vias 351 to 356 for interlayer connection of the wiring patterns in respective layers. The CPU 4 is mounted on one side of the back surface 3b of the substrate 3. The CPU 4 has an arithmetic processing function that executes arithmetic processing according to a program, and an AD conversion (analog-to-digital conversion) function.

First and second detection coils 31, 32 are formed on the substrate 3 for detecting the position of the target 2. In addition, an exciting coil 33, which is positioned along the rack shaft 13 and extends in the axial direction of the rack shaft 13, is formed on the substrate 3 to surround the first and second detection coils 31, 32. The first and second detection coils 31, 32 respectively output a voltage corresponding to the position of the detection target portions 21, 22 of the target 2 in a predetermined detection range in the movement direction of the rack shaft 13 due to the magnetic field generated by the exciting coil 33. The first detection coil 31 and the second detection coil 32 are aligned in a direction perpendicular to the direction of extension of the exciting coil 33 (the axial direction of the rack shaft 13). The CPU 4 determines the position of the rack shaft 13 by calculation based on the output voltage of the first and second detection coils 31, 32.

On the first metal layer 301, a first curved portion 301a, a second curved portion 301b, a first connection portion 301c that connects one end of the first curved portion 301a to the terminal of CPU 4, a second connection portion 301d that connects one end of the second curved portion 301b to the terminal of CPU 4, a first short-circuit line portion 301e that connects the first via 351 to the third via 353, and a second short-circuit line portion 301f that connects the fourth bias 354 to the sixth bias 356 are formed.

On the second metal layer 302, a first curved portion 302a, a second curved portion 302b, a first connection portion 302c connecting one end of the first curved portion 302a to the terminal of the CPU 4, a second connection portion 302d connecting one end of the second curved portion 302b to the terminal of the CPU 4, and an protruding portion (i.e., overhanging portion) 302e formed to protrude (i.e., overhang) from the other end of the second curved portion 302b toward the first curved portion 302a in a shortitudinal direction of the substrate are formed.

On the third metal layer 303, a first curved portion 303a, a second curved portion 303b, a first connection portion 303c that connects one end of the first curved portion 303a to the terminal of CPU 4, and a second connection portion 303d that connects one end of the second curved portion 303b to the terminal of CPU 4 are formed.

On the fourth metal layer 304, a first curved portion 304a, a second curved portion 304b, a first connection portion 304c connecting one end of the first curved portion 304a to the terminal of the CPU 4, a second connection portion 304d connecting one end of the second curved portion 304b to the terminal of the CPU 4, and a protruding portion 304e formed to protrude from one end of the first curved portion 304a toward the second curved portion 304b in the shortitudinal direction of the substrate 3 are formed.

The first curved portion 301a of the first metal layer 301 and the first curved portion 303a of the third metal layer 303 are connected at their respective other ends by the second via 352. The second curved portion 301b of the first metal layer 301 and the second curved portion 303b of the third metal layer 303 are connected at their respective other ends by the fifth via 355.

The first curved portion 302a of the second metal layer 302 and the first curved portion 304a of the fourth metal layer 304 are connected at their respective other ends by the first via 351, the third via 353, and the first short-circuit line portion 301e of the first metal layer 301. The second curved portion 302b of the second metal layer 302 and the second curved portion 304b of the fourth metal layer 304 are connected at their respective other ends by the fourth via 354, the sixth via 356, and the second short-circuit line portion 301f of the first metal layer 301.

The first and second curved portions 301a, 301b of the first metal layer 301, the first and second curved portions 302a, 302b of the second metal layer 302, the first and second curved portions 303a, 303b of the third metal layer 303, and the first and second curved portions 304a, 304b of the fourth metal layer 304 are sinusoidally curved.

The first curved portion 301a of the first metal layer 301 and the first curved portion 303a of the third metal layer 303, and the first curved portion 302a of the second metal layer 302 and the first curved portion 304a of the fourth metal layer 304 are symmetrical in the shortitudinal direction of the substrate 3 across a first symmetry axis line $A_1$ shown in FIG. 4A, respectively. The second curved portion 301b of the first metal layer 301 and the second curved portion 303b of the third metal layer 303, and the second curved portion 302b of the second metal layer 302 and the second curved portion 304b of the fourth metal layer 304 are symmetrical in the shortitudinal direction of substrate 3 across a second symmetry axis line $A_2$ shown in FIG. 4A, respectively. The first symmetry axis line $A_1$ and the second symmetry axis line $A_2$ are parallel to each other and to the axial direction of the rack shaft 13.

The first detection coil 31 has a first sine wave-shaped coil element 311 comprising the first curved portion 301a of the first metal layer 301 and the first curved portion 303a of the third metal layer 303, and a first cosine wave-shaped coil element 312 comprising the first curved portion 302a and the first short-circuit line portion 301e of the second metal layer 302 and the first curved portion 304a and the protruding portion 304e of the fourth metal layer 304. In other words, each of the first sine wave-shaped coil element 311 and the first cosine wave-shaped coil element 312 has, except for the protruding portion 304e, has a shape as viewed perpendicular to the axial direction of the rack shaft 13, which is a combination of two sinusoidal conductor wires (the first curved portion 301a and the first curved portion 303*a*, and the first curved portion 302*a* and the first curved portion 304*a*) that are symmetrical about the first symmetry axis line $A_1$.

The second detection coil 32 has a second sine wave-shaped coil element 321 comprising the second curved portion 301*b* of the first metal layer 301 and the second curved portion 303*b* of the third metal layer 303, and a second cosine wave-shaped coil element 322 comprising the second curved portion 302*b* and the protruding portion 302*e* of the second metal layer 302, and the second curved portion 304*b* of the fourth metal layer 304, and the second short-circuit line portion 301*f* of the first metal layer 301. In other words, each of the second sine wave-shaped coil element 321 and the second cosine wave-shaped coil element 322 has, except for the protruding portion 302*e*, has a shape as viewed perpendicular to the axial direction of the rack shaft 13, which is a combination of two sinusoidal conductor wires (the second curved portion 301*b* and the second curved portion 303*b*, and the second curved portion 302*b* and the second curved portion 304*b*) that are symmetrical about the second symmetry axis line $A_2$.

The exciting coil 33 is rectangular in shape having a pair of long side portions 331, 332 extending in the axial direction of the rack shaft 13 and a pair of short side portions 333, 334 between the pair of long side portions 331, 332. In this embodiment, the long side portions 331, 332 and the short side portions 333, 334 are formed as a wiring pattern in the first metal layer 301.

Of the pair of short side portions 333, 334, the short side portion 333 on the connector 50-side comprises two straight portions 333*a*, 333*b* sandwiching the first and second connection portions 301*c*, 301*d* of the first metal layer 301, the first and second connection portions 302*c*, 302*d* of the second metal layer 302, the first and second connection portions 303*c*, 303*d* of the third metal layer 303, and the first and second connection portions 304*c*, 304*d* of the fourth metal layer 304, and the respective ends of these two straight portions 333*a*, 333*b* are connected to the through-holes 300 by the connector connection portions 301*g*, 301*h* formed in the first metal layer 301.

The exciting coil 33 may be formed not only in the first metal layer 301, but also in any of the second to fourth metal layers 302 to 304 and may be formed over multiple layers. The exciting coil 33 may be formed separately from the substrate 3. In the present embodiment, the exciting coil 33 makes a single revolution around the first and second detection coils 31, 32, but the exciting coil 33 may be formed in such a manner that it revolves around the first and second detection coils 31, 32 multiple times.

Of the two detection target portions 21, 22 of the target 2, one detection target portion 21 is provided corresponding to the first detection coil 31 and the other detection target portion 22 is provided corresponding to the second detection coil 32. Hereinafter, one of the detection target portions 21 corresponding to the first detection coil 31 is referred to as the first detection target portion 21 and the other detection target portion 22 corresponding to the second detection coil 32 is referred to as the second detection target portion 22.

When the direction perpendicular to the front surface 3*a* and the back surface 3*b* of the substrate 3 is the substrate normal direction, the first detection target portion 21 is provided at a position perpendicularly aligned with the first detection coil 31 and not aligned with the second detection coil 32 in the substrate normal direction. The second detection target portion 22 is provided in a position perpendicularly aligned with the second detection coil 32 and not aligned with the first detection coil 31 in the substrate normal direction. The linear portion 23 is provided between the first detection target portion 21 and the second detection target portion 22 in the longitudinal and shortitudinal directions of the substrate 3, and is located in a position not aligned with the first detection coil 31 and the second detection coil 32 in the substrate normal direction, but aligned with the protruding portion 302*e* of the second metal layer 302 and the protruding portion 304*e* of the fourth metal layer 304 in the substrate normal direction.

A sinusoidal alternating current is supplied to the exciting coil 33 from the power supply unit 6. The first sine wave-shaped coil element 311 and the first cosine wave-shaped coil element 312 of the first detection coil 31 and the second sine wave-shaped coil element 321 and the second cosine-shaped coil element 322 of the second detection coil 32 generate an induced voltage when the magnetic flux of the magnetic field generated by the exciting coil 33 is interlinked. In addition, an eddy current is generated in the target 2 by the magnetic field generated by the exciting coil 33. This eddy current acts to cancel out the magnetic field in the portion of the substrate 3 that is aligned vertically with the target 2, so that the intensity of the magnetic field in the portion of the first detection coil 31 that is aligned in the substrate normal direction with the first detection target portion 21 is weaker than the intensity of the magnetic field in the other portion of the first detection coil 31, and the magnetic field in the portion of the second detection coil 32 that is aligned in the substrate normal direction with the second detection target portion 22 is weaker than the intensity of the magnetic field in the other portions of the second detection coil 32.

The first cosine wave-shaped coil element 312 has a first main coil portion 313 comprising the first curved portion 302*a* of the second metal layer 302, the first curved portion 304*a* of the fourth metal layer 304, and the first short-circuit line portion 301*e* of the first metal layer 301, and a first sub coil portion 314 comprising the protruding portion 304*e* of the fourth metal layer 304. The first main coil portion 313 generates a voltage according to the position of the first detection target portion 21 by the magnetic field generated by the exciting coil 33 when the first detection target portion 21 is aligned with the first detection coil 31 in the substrate normal direction. The first sub coil portion 314 generates a predetermined voltage by the magnetic field generated by the exciting coil 33 when the first detection target portion 21 is not aligned with the first detection coil 31 in the substrate normal direction.

The second cosine wave-shaped coil element 322 has a second main coil portion 323 comprising the second curved portion 302*b* of the second metal layer 302, the second curved portion 304*b* of the fourth metal layer 304, and the second short-circuit line portion 301*f* of the first metal layer 301, and a second sub coil portion 324 comprising the protruding portion 302*e* of the second metal layer 302. The second main coil portion 323 generates a voltage according to the position of the second detection target portion 22 by the magnetic field generated by the exciting coil 33 when the second detection target portion 22 is aligned with the second detection coil 32 in the substrate normal direction. The second sub coil portion 324 generates a predetermined voltage by the magnetic field generated by the exciting coil 33 when the second detection target portion 22 is not aligned with the second detection coil 32 in the substrate normal direction.

The first sub coil portion 314 (the protruding portion 304*e* of the fourth metal layer 304) has a loop-shaped electromotive portion 314*a* and a pair of connecting wire portions 314b, 314c connecting the electromotive portion 314a to the first curved portion 304a and the first connection portion 304c of the fourth metal layer 304 as shown in FIG. 4B. The electromotive portion 314a is formed in a rectangular shape and generates voltage by the magnetic flux of the magnetic field interlinked inside the electromotive portion 314a. The pair of connecting wire portions 314b, 314c extend parallel to each other along the shortitudinal direction of the substrate 3.

Of the pair of connecting wire portions 314b and 314c of the first sub coil portion 314, one connecting wire portion 314b connects one end of the electromotive portion 314a to the first curved portion 304a, and the other connecting wire portion 314c connects the other end of the electromotive portion 314a to the first connection portion 304c. In other words, the first sub coil portion 314 is interposed between the first curved portion 304a and the first connection portion 304c. The voltage generated in the electromotive portion 314a is output to the CPU 4 as the voltage of the first cosine wave-shaped coil element 312.

Figure 4C:
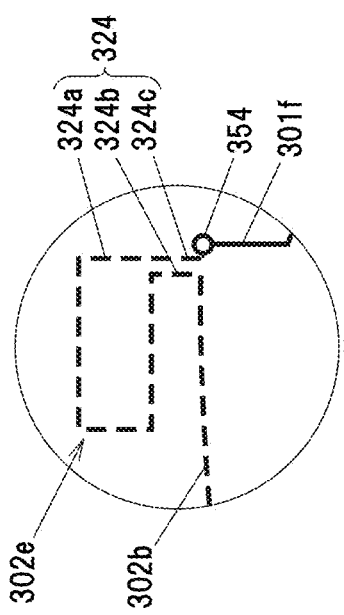
FIGS. 4B and 4C are partially enlarged views of FIG. 4A.
Figure 4B:
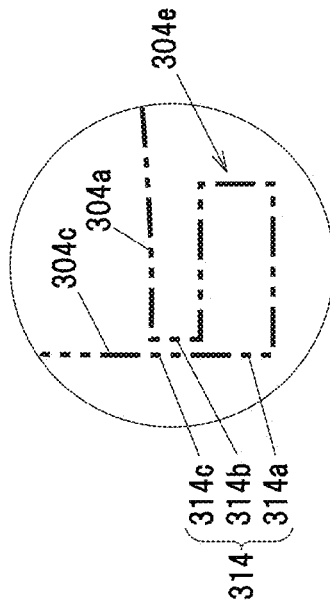
Figure 5A:
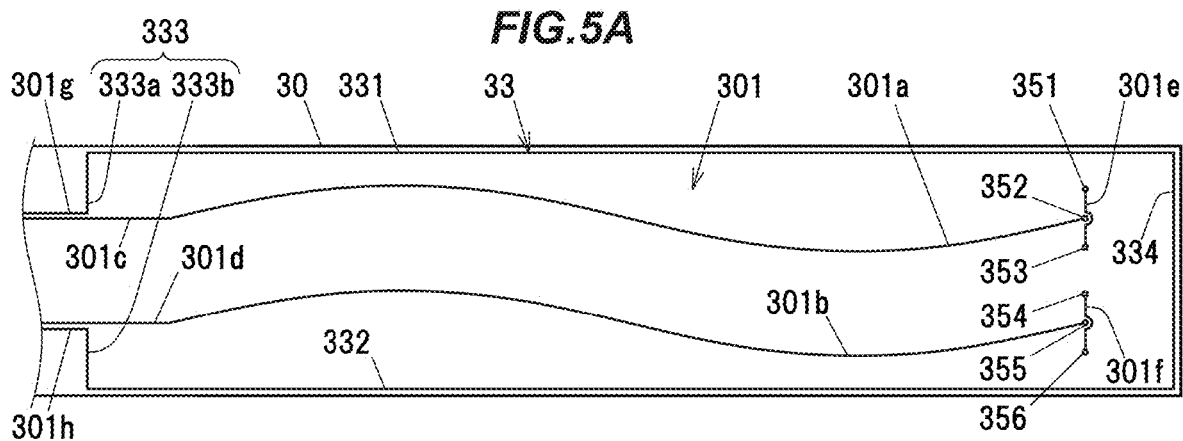
FIGS. 5A to 5D are plan views showing the first to fourth metal layers, respectively.
Figure 5B:
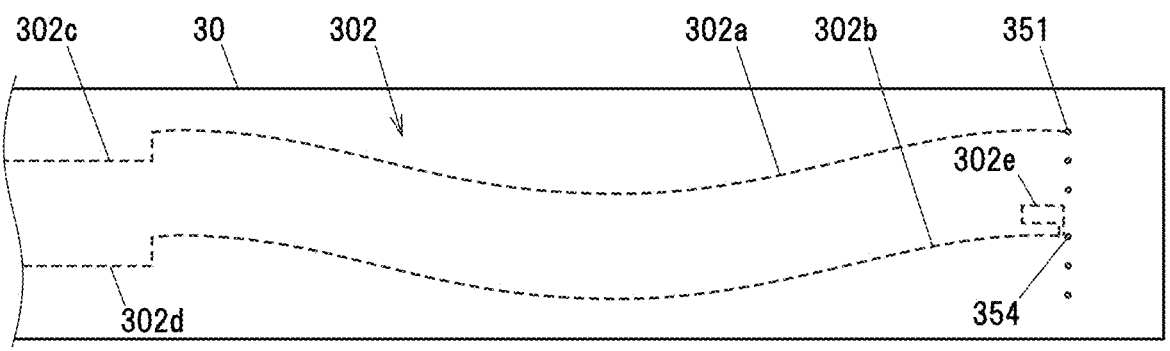
Figure 5C:
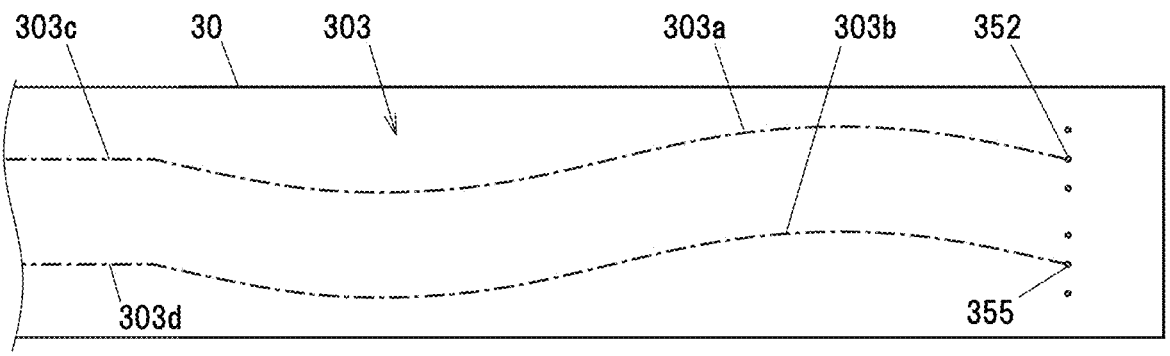
Figure 5D:
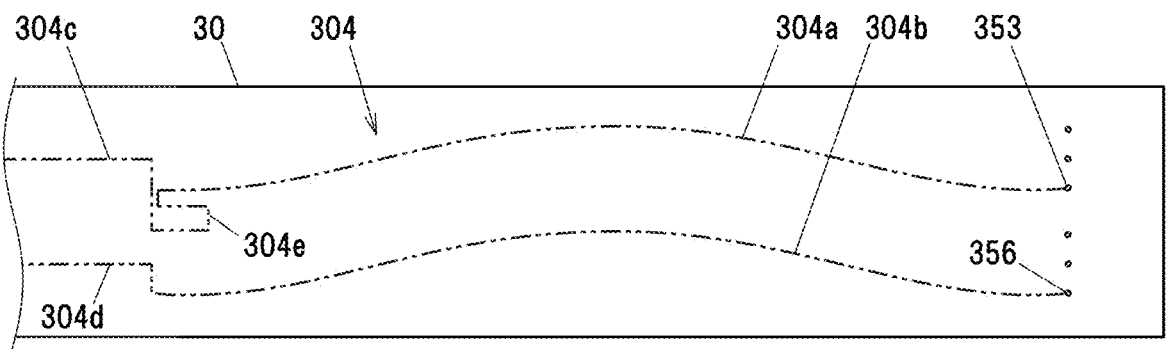

The second sub coil portion 324 (the protruding portion 302e of the second metal layer 302) has a loop-shaped electromotive portion 324a and a pair of connecting wire portions 324b, 324c connecting the electromotive portion 324a to the second curved portion 302b and the fourth via 354 of the second metal layer 302, as shown in FIG. 4C. The electromotive portion 324a is rectangular in shape and generates voltage by the magnetic flux of the magnetic field interlinked inside the electromotive portion 324a. The pair of connecting wire portions 324b, 324c extend parallel to each other along the shortitudinal direction of the substrate 3.

Of the pair of connecting wire portions 324b and 324c of the second sub coil portion 324, one connecting wire portion 324b connects one end of the electromotive portion 324a to the second curved portion 302b, and the other connecting wire portion 324b connects the other end of the electromotive portion 324a to the fourth via 354. In other words, the second sub coil portion 324 is interposed between the second curved portion 302b and the second short-circuit line portion 301f. The voltage generated in the electromotive portion 324a is output to the CPU 4 as the voltage of the second cosine wave-shaped coil element 322.

The first sub coil portion 314 and the second sub coil portion 324 are aligned in the longitudinal direction of the substrate 3 between the first main coil portion 313 and the second main coil portion 323. During the movement of the rack shaft 13, the linear portion 23 of the target 2 is aligned with the first sub coil portion 314 in the substrate normal direction while the first detection target portion 21 is aligned with the first detection coil 31 in the substrate normal direction and is aligned with the second sub coil portion 324 while the second detection target portion 22 is aligned with the second detection coil 32 in the substrate normal direction.

The voltages of the first sub coil portion 314 and the second sub coil portion 324 are used in the calculation process of the CPU 4 described below to select whether to determine the position of the rack shaft 13 by the position of the first detection target portion 21 determined by the output voltage of the first detection coil 31 or to determine the position of the second detection target portion 22 determined by the output voltage of the second detection coil 32.

The first sine wave-shaped coil element 311 may be provided with a first sub coil portion that generates a predetermined voltage by the magnetic field generated by the exciting coil 33 when the first detection target portion 21 is not aligned with the first detection coil 31 in the substrate normal direction. The second sine wave-shaped coil element 321 may be provided with a second sub coil portion that generates a predetermined voltage by the magnetic field generated by the exciting coil 33 when the second detection target portion 22 is not aligned with the second detection coil 32 in the substrate normal direction. In other words, at least any of the first sine wave-shaped coil element 311 and the first cosine wave-shaped coil element 312 may have a first sub coil portion, and at least any of the second sine wave-shaped coil element 321 and the second cosine wave-shaped coil element 322 may have a second sub coil portion.

By providing the first sub coil portion 314 in the first cosine wave-shaped coil element 312, where the distance between the two sinusoidal conductor wires is large at the end of the first detection coil 31, and providing the second sub coil portion 324 in the second cosine wave-shaped coil element 322, where the distance between the two sinusoidal conductor wires is large at the end of the second detection coil 32, the space of the substrate 3 can be effectively utilized and the substrate 3 can be downsized.

The peak value of the voltage induced in the first sine wave-shaped coil element 311 and the first cosine wave-shaped coil element 312 (the first main coil portion 313) when the first detection target portion 21 is aligned with the first detection coil 31 in the substrate normal direction varies with the position of the first detection target portion 21 relative to the substrate 3. The peak value of the voltage induced in the second sine wave-shaped coil element 321 and the second cosine wave-shaped coil element 322 (the second main coil portion 323) when the second detection target portion 22 is aligned with the second detection coil 32 in the substrate normal direction varies with the position of the second detection target portion 22 relative to the substrate 3. Here, the peak value of the voltage refers to the maximum value of the absolute value of the voltage within a period of one cycle of the alternating current supplied to the exciting coil 33.

The phases of the peak values of the voltages induced in the first sine wave-shaped coil element 311 and the first cosine wave-shaped coil element 312 while the first detection target portion 21 moves from one end of the first detection coil 31 to the other end are different from each other. The phases of the peak values of the voltages induced in the second sine wave-shaped coil element 321 and the second cosine wave-shaped coil element 322 while the second detection target portion 22 moves from one end of the second detection coil 32 to the other end are also different from each other.

In the present embodiment, the phase difference between the peak values of the voltages induced in the first sine wave-shaped coil element 311 and the first cosine wave-shaped coil element 312 of the first detection coil 31, and the phase difference between the peak values of the voltages induced in the second sine wave-shaped coil element 321 and the second cosine wave-shaped coil element 322 of the second detection coil 32, are 90°, respectively. The voltage induced in the first sine wave-shaped coil element 311 and the first cosine wave-shaped coil element 312 of the first detection coil 31 and the voltage induced in the second sine wave-shaped coil element 321 and the second cosine wave-shaped coil element 322 of the second detection coil 32 are output to the CPU 4 as output voltage, respectively.

As shown in FIG. 4A, between each of the pair of short side portions 333, 334 of the exciting coil 33 and the first detection coil 31 and the second detection coil 32, a first buffer region $E_1$ and a second buffer region $E_2$ are provided for suppressing the voltage induced in the first sine wave-shaped coil element 311, the first cosine wave-shaped coil element 312, the second sine wave-shaped coil element 321, and the second cosine wave-shaped coil element 322 by the magnetic flux generated by the electric current flowing through the pair of short side portions 333, 334.

In addition, in order to suppress the induced voltage generated when the first detection target portion 21 or the second detection target portion 22 exists in a position aligned with the first buffer region $E_1$ in the substrate normal direction, the respective first connector connection portions 301c, 302c, 303c, 304c of the first to fourth metal layers 301 to 304 overlap in the thickness direction of the substrate 3, and the respective second connector connection portions 301d, 302d, 303d, 304d of the first to fourth metal layers 301 to 304 overlap in the thickness direction of the substrate 3.

FIG. 6 is a graph showing an example of a relationship between supply voltage $V_0$ supplied from the power supply unit 6 to the exciting coil 33, an induced voltage $V_{S1}$ induced in the first sine wave-shaped coil element 311 of the first detection coil 31 and an induced voltage $V_{C1}$ induced in the first cosine wave-shaped coil element 312 of the first detection coil 31. In the graph of FIG. 6, the horizontal axis is the time axis, and the left and right vertical axes indicate the supply voltage $V_0$ and the induced voltages $V_{S1}$, $V_{C1}$. A high-frequency AC voltage of, e.g., about 1 MHz is supplied as the supply voltage $V_0$ to the exciting coil 33.

The supply voltage $V_0$ and the induced voltages $V_{S1}$, $V_{C1}$ are in phase with each other in the example shown in FIG. 6. However, the induced voltage $V_{S1}$ induced in the first sine wave-shaped coil element 311 switches between in-phase and antiphase at the time that the first detection target portion 21 passes through a position corresponding to an intersection point between the first curved portion 301a of the first metal layer 301 and the first curved portion 303a of the third metal layer 303 as viewed in the substrate normal direction. Likewise, the induced voltage $V_{C1}$ induced in the first cosine wave-shaped coil element 312 switches between in-phase and antiphase at the time that the first detection target portion 21 passes through a position corresponding to an intersection point between the first curved portion 302a of the second metal layer 302 and the first curved portion 304a of the fourth metal layer 304 as viewed in the substrate normal direction.

Figure 7A:
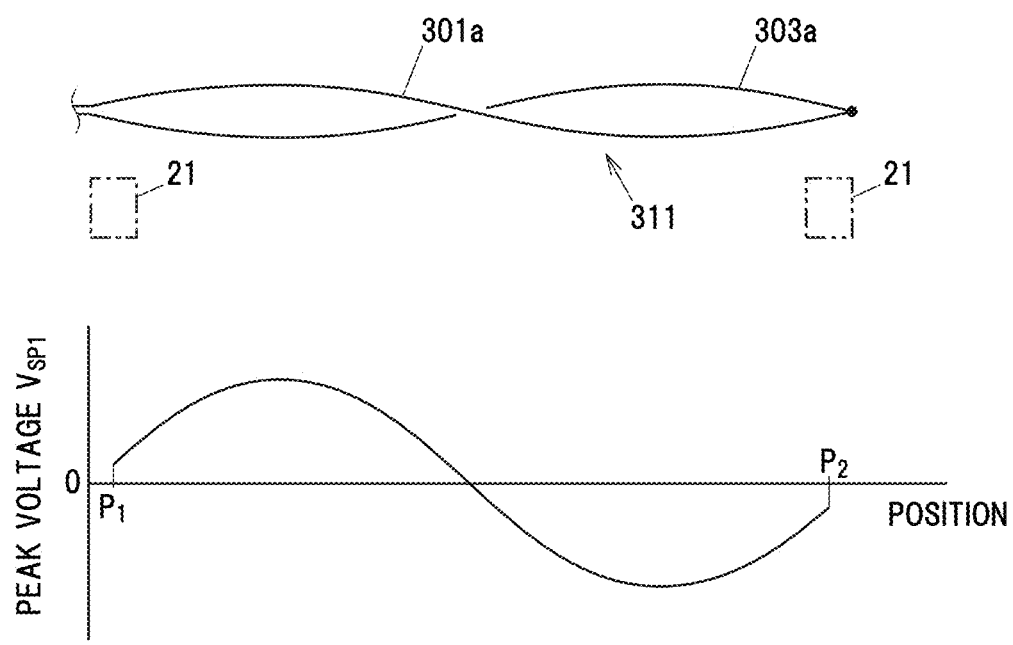
FIG. 7A is an explanatory diagram of the relationship between the peak voltage, which is the peak value of the induced voltage induced in the first sine wave-shaped coil element, and the position of a first target.
Figure 7B:
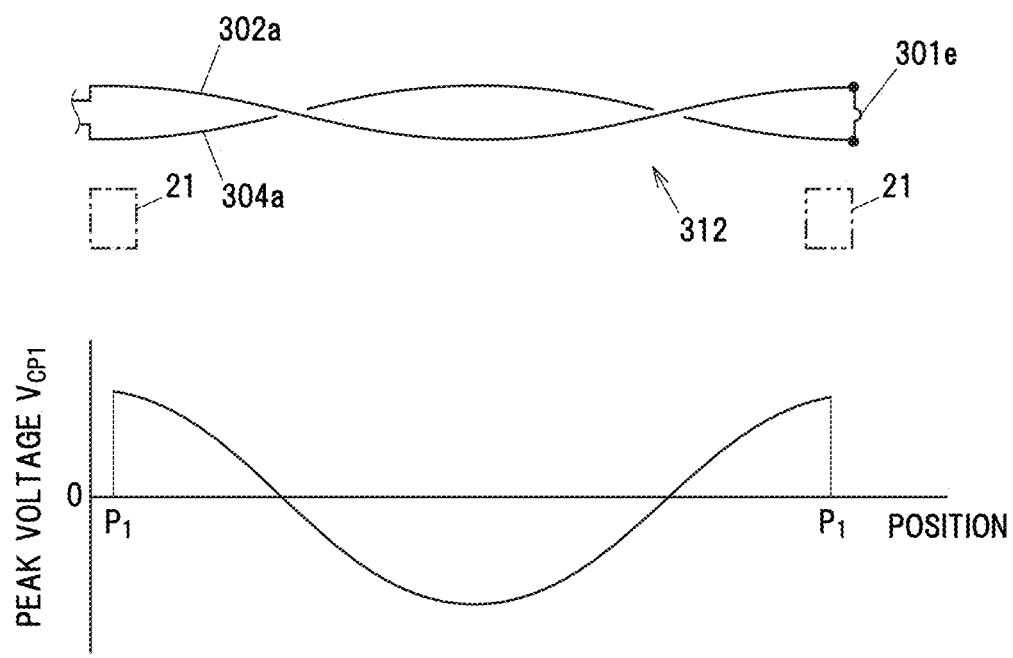
FIG. 7B is an explanatory diagram of the relationship between the peak voltage, which is the peak value of the induced voltage induced in the first cosine wave-shaped coil element, and the position of a second target.

FIG. 7A is an explanatory diagram schematically illustrating a relationship between the position of the first detection target portion 21 and peak voltage $V_{SP1}$ which is the peak value of the induced voltage $V_{S1}$ induced in the first sine wave-shaped coil element 311. FIG. 7B is an explanatory diagram schematically illustrating a relationship between the position of the first detection target portion 21 and peak voltage $V_{CP1}$ which is the peak value of the induced voltage $V_{C1}$ induced in the first cosine wave-shaped coil element 312.

In the graphs of the peak voltages $V_{SP1}$ and $V_{CP1}$ shown in FIGS. 7 and 6B, the horizontal axis indicates the position of the center of the first detection target portion 21. $P_1$ on the horizontal axis indicates the position of a center point of the first detection target portion 21 when the left end of the first detection target portion 21 coincides with the left ends of the first sine wave-shaped coil element 311 and the first cosine wave-shaped coil element 312. $P_2$ on the horizontal axis indicates the position of the center point of the first detection target portion 21 when the right end of the first detection target portion 21 coincides with the right ends of the first sine wave-shaped coil element 311 and the first cosine wave-shaped coil element 312. In FIGS. 7A and 7B, the first detection target portion 21 when its center point is located at the position $P_1$ is indicated by a dashed-dotted line, and the first detection target portion 21 when its center point is located at the position $P_2$ is indicated by a dashed-double-dotted line.

The output voltage of the first sine wave-shaped coil element 311 and the cosine wave-shaped coil element 312 varies according to the position of the rack shaft 13, due to the difference between the intensity of the magnetic field in the portion facing the first detection target portion 21 in the substrate normal direction and the intensity of the magnetic field in the portion not facing the first detection target portion 21.

In the graph shown in FIG. 7A, the peak voltage $V_{SP1}$ has a positive value when the induced voltage $V_{S1}$ induced in the first sine wave-shaped coil element 311 is in phase with the supply voltage $V_0$ supplied to the exciting coil 33, and has a negative value when in antiphase. Likewise, in the graph shown in FIG. 7B, the peak voltage $V_{CP1}$ has a positive value when the induced voltage VC1 induced in the first cosine wave-shaped coil element 312 is in phase with the supply voltage $V_0$ supplied to the exciting coil 33, and has a negative value when in antiphase.

When the rack shaft 13 moves at a constant speed in one direction, while the entire first detection target portion 21 in the axial direction of the rack shaft 13 overlaps the first sine wave-shaped coil element 311 and the first cosine wave-shaped coil element 312 (the first main coil portion 313) in the substrate normal direction, the peak voltage $V_{SP1}$ changes sinusoidally and the peak voltage $V_{CP1}$ changes cosinusoidally as shown in FIGS. 7A and 7B. Thus, the CPU 4 can determine the position of the rack shaft 13 by calculation based on the output voltages of the first sine wave-shaped coil element 311 and the first cosine wave-shaped coil element 312.

Similarly for the second detection coil 32, when the rack shaft 13 moves at a constant speed in one direction, while the entire second detection target portion 22 in the axial direction of the rack shaft 13 overlaps the second sine wave-shaped coil element 321 and the second cosine wave-shaped coil element 322 (the second main coil portion 323) in the substrate normal direction, the peak voltage $V_{SP2}$, which is the peak value of the induced voltage $V_{S2}$ induced in the second sine wave-shaped coil element 321, changes sinusoidally and the peak voltage $V_{CP1}$, which is the peak value of the induced voltage $V_{C2}$ induced in the second cosine wave-shaped coil element 322, changes cosinusoidally. Thus, the CPU 4 can determine the position of the rack shaft 13 by calculation based on the output voltages of the second sine wave-shaped coil element 321 and the second cosine wave-shaped coil element 322. The details of the calculation method of the position of rack shaft 13 by the CPU 4 are described below.

FIGS. 8A to 8C are explanatory diagrams showing the relative positional relationships between the first and second detection coils 31, 32 and the first and second detection target portions 21, 22 in the substrate normal direction. In FIGS. 8A to 8C, the first and second detection coils 31, 32 and the exciting coil 33, the rack shaft 13 and the target 2 are shown superimposed in the substrate normal direction, looking through the substrate 3 from the back surface 3b-side of the substrate 3.

In FIGS. 8A to 8C, a center point $C_1$ of the area where the first and second detection coils 31, 32 are formed on the substrate 3, center points $C_{21}$, $C_{22}$ of the first and second detection target portions 21, 22, respectively, and a midpoint $C_2$ of the center points $C_{21}$, $C_{22}$.

FIG. 8A shows a state in which the steering angle of the steering wheel 17 is zero, the rack shaft 13 is in the neutral position, and the center point $C_1$ and the midpoint $C_2$ coincide. In this state, the right end of the first detection target portion 21 and the right end of the first detection coil 31 are aligned, and the left end of the second detection target portion 22 and the left end of the second detection coil 32 are aligned.

FIG. 8B shows a state in which the right end of the second detection target portion 22 and the right end of the second detection coil 32 are aligned. The axial distance of the rack shaft 13 between the center point $C_1$ and the midpoint $C_2$ in this state is $L_1$. This distance $L_1$ is the detection range in which the position of the first detection target portion 21 can be detected by the first detection coil 31.

FIG. 8C shows the state in which the left end of the first detection target portion 21 and the left end of the first detection coil 31 are aligned. The axial distance of the rack shaft 13 between the center point $C_1$ and the midpoint $C_2$ in this state is $L_2$. This distance $L_2$ is the detection range in which the position of the second detection target portion 22 can be detected by the second detection coil 32.

Thus, the detection range in which the position of the first detection target portion 21 can be detected by the first detection coil 31 and the detection range in which the position of the second detection target portion 22 can be detected by the second detection coil 32 are offset in the moving direction of the rack shaft 13. In the neutral position of the rack shaft 13, the position of the first detection target portion 21 can be detected by the first detection coil 31 and the position of the second detection target portion 22 can be detected by the second detection coil 32. In other words, the detection range in which the position of the first detection target portion 21 can be detected by the first detection coil 31 and the detection range in which the position of the second detection target portion 22 can be detected by the second detection coil 32 overlap in part and are continuous in the movement direction of the rack shaft 13.

The CPU 4 can determine the absolute position of the rack shaft 13 centered on the neutral position of the rack shaft 13 over an axial range of lengths $L_1+L_2$, where $L_1+L_2$ is the same as or longer than the length of the stroke range R of the rack shaft 13 (see FIG. 1). The stroke sensor 1 can detect the absolute position of the rack shaft 13 over the entire stroke range R.

Figure 9:
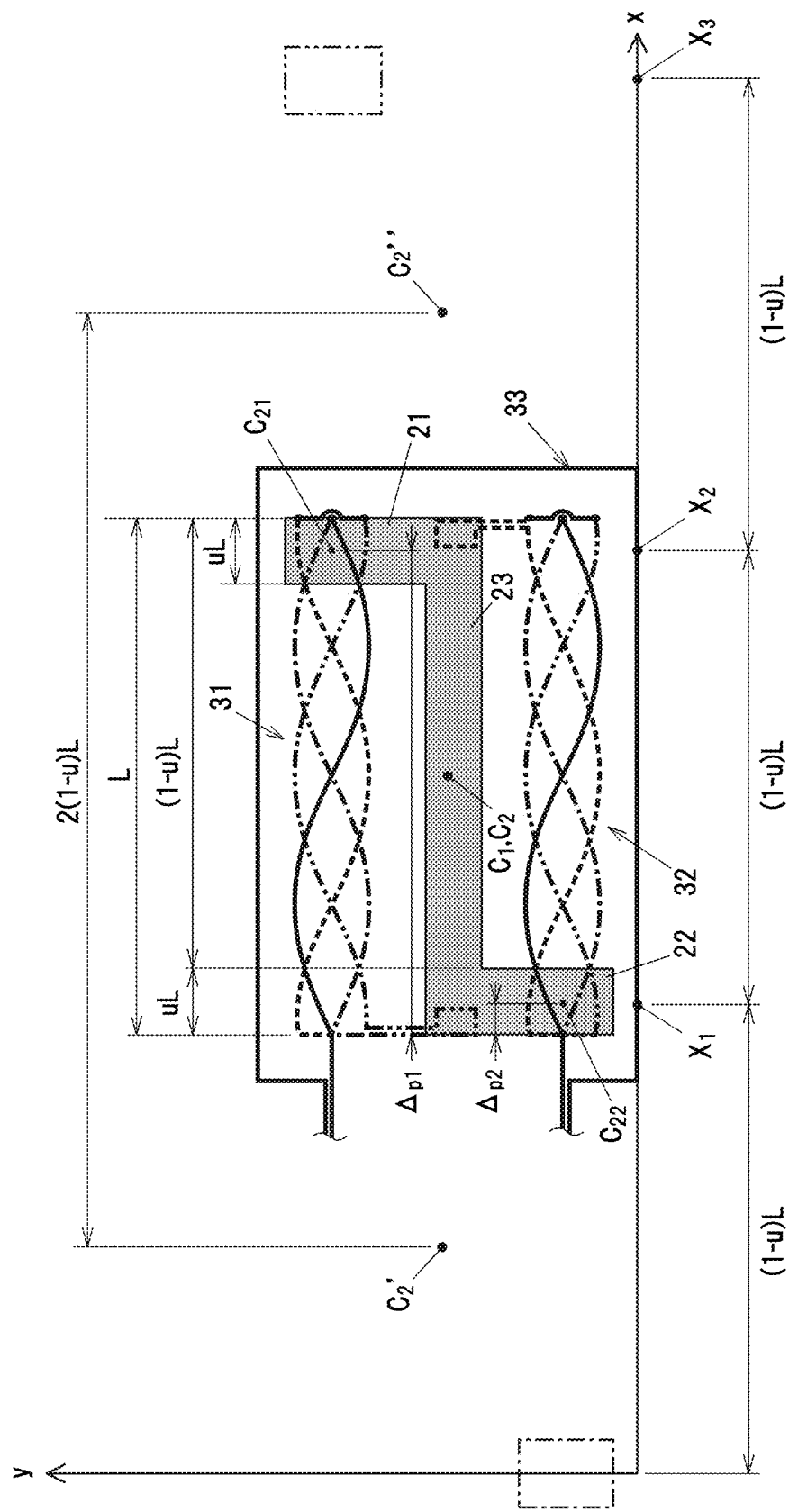
FIG. 9 is a schematic diagram showing a dimensional correlation of the exciting coil, the first and second detection coils, and the first and second targets on the substrate.

FIG. 9 is a schematic diagram showing the dimensional relationship between the first and second detection coils 31, 32, the exciting coil 33 and the first and second detection target portions 21, 22 in the substrate 3. In FIG. 9, the axial direction of the rack shaft 13 is the x-axis direction, and the y-axis direction is parallel to the substrate 3 and perpendicular to the x-axis direction. In FIGS. 8A to 8C, the dimensions of the first and second detection coils 31, 32 and the exciting coil 33 in the y-axis direction are shown enlarged by a factor of 2, and the distance between the first detection coil 31 and the second detection coil 32 is widened in the y-axis direction.

The origin of the x-axis is the position of the center point $C_{22}$ of the second detection target portion 22 in the state shown in FIG. 8C, and the origin of the y-axis is the position of one of the long side portions 332 of the exciting coil 33. The coordinate point $X_1$ on the x-axis indicates the x-axis position of the center point $C_{22}$ of the second detection target portion 22 in the state shown in FIG. 8A; the coordinate point $X_2$ on the x-axis indicates the x-axis position of the center point $C_{21}$ of the first detection target portion 21 in the state shown in FIG. 8A; and the coordinate point $X_3$ on the x-axis indicates the x-axis position of the center point $C_{21}$ of the first detection target portion 21 in the state shown in FIG. 8B. The coordinate point $C_2'$ is the midpoint $C_2$ of the center points $C_{21}$, $C_{22}$ of the first and second detection target portions 21, 22 in the state shown in FIG. 8C, and the coordinate point $C_2''$ is the midpoint $C_2$ of the center points $C_{21}$, $C_{22}$ of the first and second detection target portions 21, 22 in the state shown in FIG. 8B.

In FIG. 9, L is the x-axis length of the first and second detection coils 31, 32. u is the ratio of the x-axis lengths of the first and second detection target portions 21, 22 to L. $\Delta p_1$ is the x-axis distance from the left end of the first detection coil 31 to the center point $C_{21}$ of the first detection target portion 21. $\Delta p_2$ is the x-axis distance from the left end of the second detection coil 32 to the center point $C_{22}$ of the second detection target portion 22.

When the first detection target portion 21 overlaps the first sine wave-shaped coil element 311 and the first cosine wave-shaped coil element 312 in the substrate normal direction, $\Delta p_1$ can be obtained by the following formula (1).

Formula (1)

$$\Delta p_1 = L \frac{\tan^{-1}\left(\frac{V_{SP1}}{V_{CP1}}\right)}{2\pi} \quad (1)$$

When the second detection target portion 22 overlaps the second sine wave-shaped coil element 321 and the second cosine wave-shaped coil element 322 in the substrate normal direction, $\Delta p_2$ can be obtained by the following formula (2).

Formula (2)

$$\Delta p_2 = L \frac{\tan^{-1}\left(\frac{V_{SP2}}{V_{CP2}}\right)}{2\pi} \quad (2)$$

The calculation process of $\tan^{-1}$ (arc tangent) can be performed by referring to a sequence of numbers (look-up table) stored in a nonvolatile memory element, for example, to reduce the calculation load.

Thus, the CPU 4 calculates $\Delta p_1$ according to the result of the division ($V_{SP1}/V_{CP1}$) with the output voltage of the first cosine wave-shaped coil element 312 as the denominator, and $\Delta p_2$ according to the result of the division ($V_{SP2}/V_{CP2}$) with the output voltage of the second cosine wave-shaped coil element 322 as the denominator. For each of the first detection coil 31 and the second detection coil 32, the CPU 4 performs division using the output voltage of the first cosine wave-shaped coil element 312 and the second cosine wave-shaped coil element 322 as the denominator, and determines the detection coil with the larger absolute value of the quotient that is the result of this division (the first detection coil 31 or the second detection coil 32), the position of the rack shaft 13 is obtained by the output voltage of the one with the larger quotient.

The distance travelled by the rack shaft 13 in the x-axis direction over which the CPU 4 can determine the absolute position of the rack shaft 13 by formula (1) and the distance travelled by the rack shaft 13 in the x-axis direction over which the CPU 4 can determine the absolute position of the rack shaft 13 by formula (2) are respectively (1−u)L. Therefore, the overall travel distance of the rack shaft 13 for which the CPU 4 can determine the absolute position of the rack shaft 13 is 2(1−u)L. The value of u is smaller than 0.5. The smaller the value of u, the more the absolute position of the rack shaft 13 can be detected over a longer distance, but if the value of u is too small, the error is likely to become larger. Therefore, the value of u should be, e.g., 0.01 or more and less than 0.5.

Figure 10:
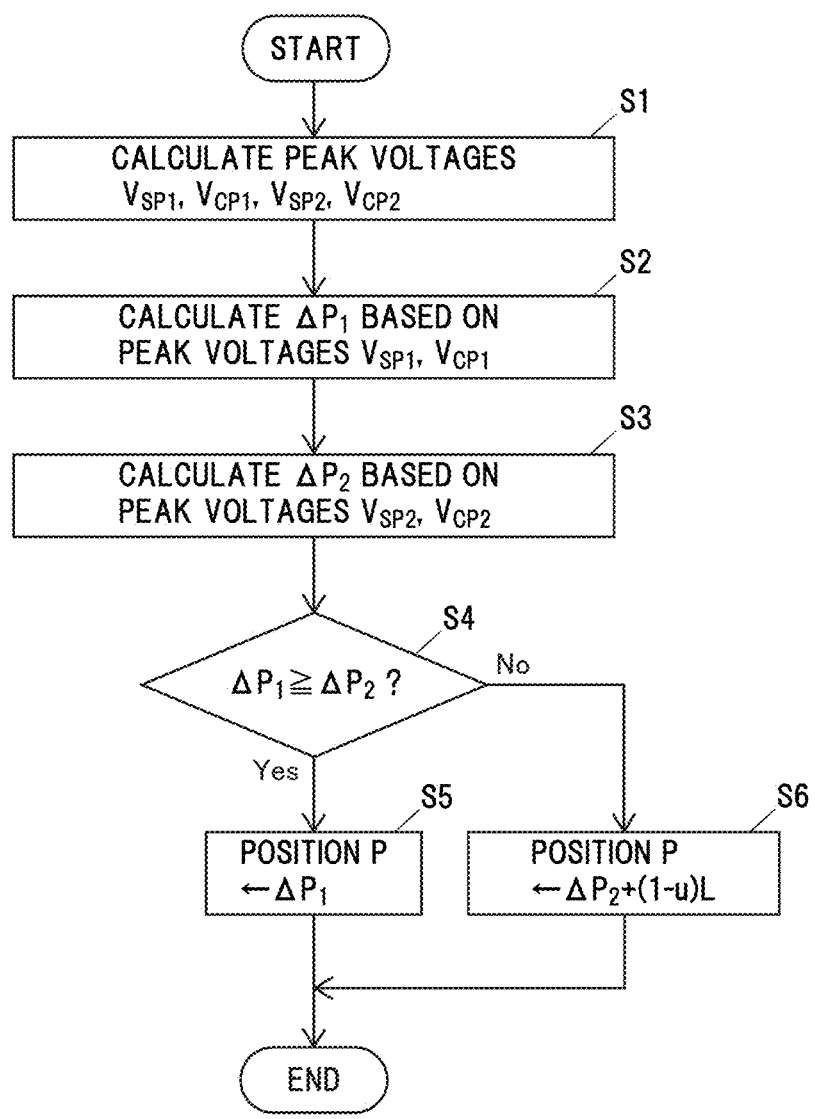
FIG. 10 is a flowchart showing an example of the calculation process performed by the CPU to determine the position of the rack shaft.

FIG. 10 is a flowchart showing an example of the calculation process performed by the CPU 4 to obtain the position P of rack shaft 13. The CPU 4 executes the process shown in this flowchart in a predetermined calculation cycle and outputs the information of the position P of the rack shaft 13 to the steering controller 19.

In this calculation process, the CPU 4 calculates the peak voltages $V_{SP1}$, $V_{CP1}$, $V_{SP2}$, $V_{CP2}$ (step S1), $\Delta p_1$ based on the peak voltages $V_{SP1}$, $V_{CP1}$ according to formula (1) above (step S2), and $\Delta p_2$ based on the peak voltages $V_{SP2}$, $V_{CP2}$ according to formula (2) above (step S3). In the selection process (step S4) according to the magnitude relationship of absolute values of $\Delta p_1$ and $\Delta p_2$ (step S4), the CPU 4 sets the value of $\Delta p_1$ as the position P if the absolute value of $\Delta p_1$ is the same as or larger than the absolute value of $\Delta p_2$ (step S5), and sets the sum of the value of $\Delta p_2$ and (1−u)L as the position P if the absolute value of $\Delta p_2$ is larger than the absolute value of $\Delta p_1$ (Step S6).

Since the absolute value of $\Delta p_1$ is larger the larger the absolute value of ($V_{SP1}/V_{CP1}$) and the absolute value of $\Delta p_2$ is larger the larger the absolute value of ($V_{SP2}/V_{CP2}$), the selection process in step S4 is synonymous with comparing the absolute value of the quotient that is the result of division of ($V_{SP1}/V_{CP1}$) and the absolute value of the quotient that is the result of division of ($V_{SP2}/V_{CP2}$).

Here, for example, as shown in FIG. 8B, if the first detection target portion 21 is not aligned with the first detection coil 31 in the substrate normal direction, the voltage induced in the first sine wave-shaped coil element 311 and the first cosine wave-shaped coil element 312 (the first main coil portion 313) will be approximately zero. If the first cosine wave-shaped coil element 312 does not have the first sub coil portion 314, the absolute value of ($V_{SP1}/V_{CP1}$) will be extremely large due to a slight error in $V_{CP1}$, which may cause a wrong selection in the selection process in step S4.

However, when the first detection target portion 21 is not aligned with the first detection coil 31 in the substrate normal direction, the voltage induced in the electromotive portion 314a of the first sub coil portion 314 does not cause $V_{CP1}$ to be approximately zero, and the selection process in step S4 is properly performed. When the first detection target portion 21 is aligned with the first detection coil 31 in the substrate normal direction, no voltage is induced in the first sub coil portion 314, and the first sub coil portion 314 does not affect the calculation of $\Delta p_1$. This allows for proper calculation of the position P of the rack shaft 13.

Also, as shown in FIG. 8C, for example, even when the second detection target portion 22 is not aligned with the second detection coil 32 in the substrate normal direction, the voltage induced in the electromotive portion 324a of the second sub coil portion 324 prevents $V_{CP2}$ from becoming zero approximately, so the selection process in step S4 can be performed properly and the calculation of the position P of the shaft 13 can be performed appropriately.

As described above, according to this embodiment, the position of the rack shaft 13 can be determined based on the output voltage of the first detection coil 31 having the first sub coil portion 314 in the first cosine wave-shaped coil element 312 and the second detection coil 32 having the second sub coil portion 324 in the second cosine wave-shaped coil element 322. Thus, it is possible to provide a compact and lightweight stroke sensor 1 which can accurately determine the position of the rack shaft 13.

Modified Example

Figure 11:
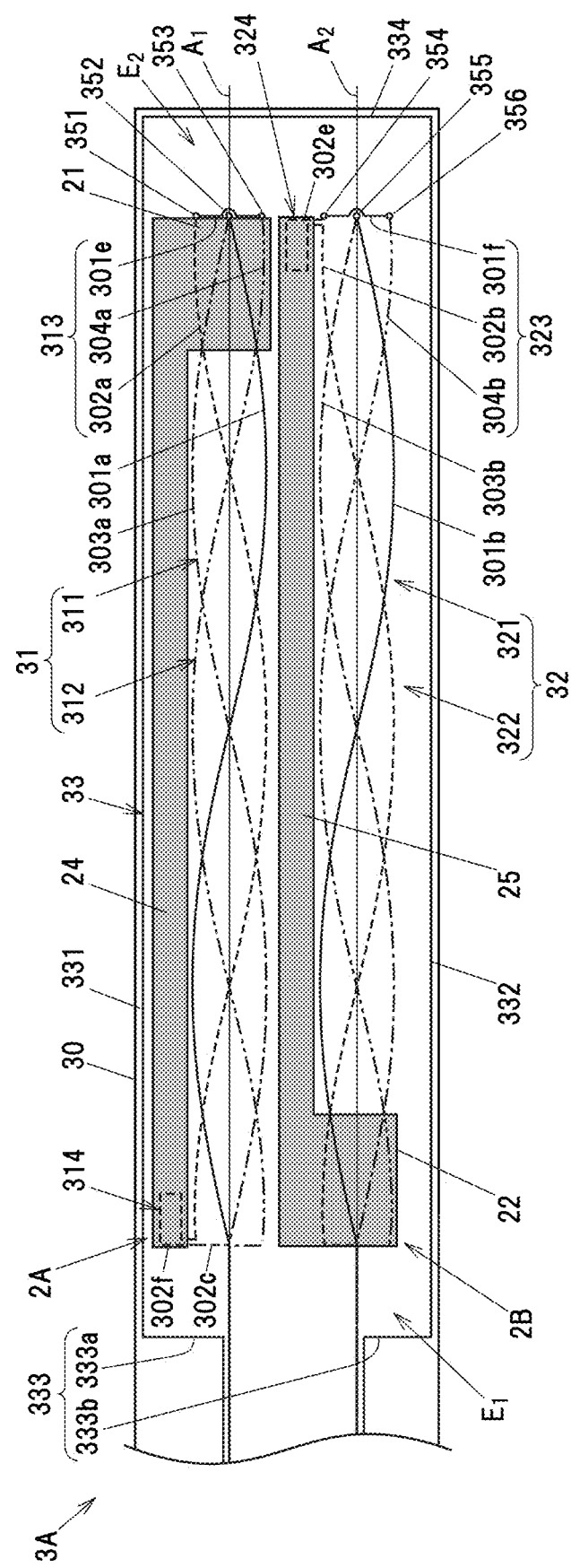
FIG. 11 is a configuration diagram showing the substrate and the first and second targets according to a modified example.

FIG. 11 is a configuration diagram showing the configuration of a substrate 3A and first and second targets 2A, 2B in a modified example. The first and second targets 2A, 2B are electrically conductive members attached to the rack shaft 13, and the substrate 3A is mounted in the case member 5 as in the above embodiment. In FIG. 11, components corresponding to those described in FIG. 4A for the first embodiment are marked with the same symbols as those in FIG. 4A, and duplicated explanations are omitted.

In the above embodiment, the case where the target 2 has the first and second detection target portions 21, 22 and the linear portion 23 is provided between the first and second detection target portions 21, 22 is described. In this modified example, the first target 2A has the first detection target portion 21 and a first linear portion 24 in one piece and the second target 2B has the second detection target portion 22 and a second linear portion 25 in one piece. The first linear portion 24 and the second linear portion 25 extend parallel to the axial direction of the rack shaft 13.

In the above embodiment, the case where the first sub coil portion 314 (the protruding portion 304e of the fourth metal layer 304) and the second sub coil portion 324 (the protruding portion 302e of the second metal layer 302) are provided between the first main coil portion 313 and the second main coil portion 323 in the shortitudinal direction of the substrate 3 is explained. In this modified example, however, the first sub coil portion 314 is provided between the first main coil portion 313 and the long side portion 331 of the exciting coil 33. The first sub coil portion 314 is composed of a protruding portion (i.e., overhanging portion) 302f of the second metal layer 302, and the protruding portion 302f is interposed between the first curved portion 302a and the first connection portion 302c of the second metal layer 302, and provided at the end of the first cosine wave-shaped coil element 312.

The first linear portion 24 is aligned with the first sub coil portion 314 in the substrate normal direction while the first detection target portion 21 is aligned with the first detection coil 31 in the substrate normal direction during the movement of the rack shaft 13. The second linear portion 25 is aligned with the second sub coil portion 324 while the second detection target portion 22 is aligned with the second detection coil 32 in the substrate normal direction during the movement of the rack shaft 13.

This modified example can also achieve the same effect as the above embodiment.

SUMMARY OF THE EMBODIMENTS

Technical ideas understood from the embodiment will be described below citing the reference signs, etc., used for the embodiment. However, each reference sign, etc., described below is not intended to limit the constituent elements in the claims to the members, etc., specifically described in the embodiment.

According to the first feature, a position detection device (stroke sensor) 1 configured to detect a position of a moving member (rack shaft) 13 moving backward and forward in a predetermined moving direction includes an exciting coil 33 disposed along the moving member 13 extending in the moving direction, a detection coil 31, 32 that outputs a voltage corresponding to a position of a detection target portion 21, 22 moving with the moving member 13 by means of a magnetic field generated by the exciting coil 33 within a predetermined detection range in the moving direction, and a calculation unit 40 that calculates the position of the moving member 13 by the output voltage of the detection coil 31, 32, wherein the detection coil 31, 32 has a pair of coil elements 311, 312, 321, 322 whose output voltage changes according to the position of the moving member 13, and phases of the output voltages of the pair of coil elements 311, 312, 321, 322 during movement of the moving member 13 within the detection range differ from each other, and at least any coil element 312, 322 of the pair of coil elements 311, 312, 321, 322 has a main coil portion 313, 323 that generates a voltage according to the position of the detection target portion 21, 22 by a magnetic field generated by the exciting coil 33 when the position of the detection target portion 21, 22 is within the detection range, and a sub coil portion 314, 324 that generates a voltage by the magnetic field generated by the exciting coil 33 when the position of the detection target portion 21, 22 is outside the detection range.

According the second feature, in the position detection device 1 as described in the first feature, each of the pair of coil elements 311, 312, 321, 322, except for the sub coil portion 314, 324, has a shape, when viewed from a direction perpendicular to the moving direction, composed of a combination of two sinusoidal conductor wires 301a, 302a, 303a, 304a, 301b, 302b, 303b, 304b that are symmetrical across a symmetry axis line A1, A2 parallel to the moving direction, and, of the pair of coil elements 311, 312, 321, 322, one coil element 312, 322 with a larger distance between the conductor wires 301a, 302a, 303a, 304a, 301b, 301b, 304b than the other coil element 312, 322 at an end portion of the detection coil 31, 32 has the sub coil portion 314, 324 at the end portion.

According the third feature, in the position detection device 1 as described in the first feature, the calculation unit 40 determines the position of the moving member 13 according to a result of division using the output voltage of the at least any coil element 312, 322 having the sub coil portion 314, 324 as a denominator.

According the fourth feature, in the position detection device 1 as described in the first feature, a plurality of the detection coils 31, 32 are arranged in a direction perpendicular to an extending direction of the exciting coil 33, and a plurality of the detection target portions 21, 22 are arranged at different positions in the moving direction corresponding respectively to the plurality of detection coils 31, 32, wherein the detection range of each of the plurality of detection coils 31, 32 is offset in the moving direction of the moving member 13.

According the fifth feature, in the position detection device 1 as described in the fourth feature, the calculation unit 40 performs, for each of the plurality of detection coils 31, 32, division with an output voltage of the at least any coil element 312, 322 having the sub coil portion 314, 324 as a denominator, and determines the position of the moving member 13 by an output voltage of one of the detection coils 31, 32 whose absolute value of a result of the division is larger than other detection coils.

According the sixth feature, in the position detection device 1 as described in the fourth feature, the exciting coil 33 and the plurality of detection coils 31, 32 are formed on a single substrate 3, 3A, and the exciting coil 33 is formed on the substrate 3, 3A to surround the plurality of detection coils 31, 32.

According the seventh feature, the position detection device 1 as described in any one of the first to sixth features further includes a conductive member (target, first and second targets) 2, 2A, 2B attached to the moving member 13, wherein the detection target portion 21, 22 is formed on the conductive member 2, 2A, 2B.

The above described embodiment and modified example of the invention do not limit the invention as claimed above. It should also be noted that not all of the combinations of features described in each of the embodiment and modified example are essential to the means for solving the problems of the invention.

The present invention can be implemented with appropriate modifications to the extent that the intent is not departed from. For example, in the above embodiment, the case of detecting the position of the rack shaft 13 using the first and second detection coils 31, 32 is described, but depending on the travel distance of the rack shaft 13 or the length of the substrate 3, it is also possible to detect the position of the rack shaft 13 using only the first detection coil 31, for example. In the above embodiment, the case where the moving member as a detection target whose position is detected by the stroke sensor 1 is the rack shaft 13 of the steering device 10 is described. However, the moving member as the detection target is not limited to this case and can be an automotive shaft or non-automotive shaft. In addition, the shape of the moving member is not limited to a shaft-like body, but can be of various shapes, such as a flat plate, for example.

The invention claimed is:

1. A position detection device configured to detect a position of a moving member moving backward and forward in a predetermined moving direction, comprising:
   an exciting coil disposed along the moving member extending in the moving direction;
   a detection coil that outputs a voltage corresponding to a position of a detection target portion moving with the moving member by means of a magnetic field generated by the exciting coil within a predetermined detection range in the moving direction; and
   a calculation unit that calculates the position of the moving member by the output voltage of the detection coil,
   wherein the detection coil includes a pair of coil elements whose output voltage changes according to the position of the moving member, and phases of the output voltages of the pair of coil elements during movement of the moving member within the detection range differ from each other, and
   wherein at least any coil element of the pair of coil elements includes a main coil portion that generates a voltage according to the position of the detection target portion by a magnetic field generated by the exciting coil when the position of the detection target portion is within the detection range, and a sub coil portion that generates a voltage by the magnetic field generated by the exciting coil when the position of the detection target portion is outside the detection range.

2. The position detection device, according to claim 1, wherein each of the pair of coil elements, except for the sub coil portion, has a shape, when viewed from a direction perpendicular to the moving direction, composed of a combination of two sinusoidal conductor wires that are symmetrical across a symmetry axis line parallel to the moving direction, and
   wherein, of the pair of coil elements, one coil element with a larger distance between the conductor wires at an end portion of the detection coil than an other coil element has the sub coil portion at the end portion.

3. The position detection device, according to claim 1, wherein the calculation unit determines the position of the moving member according to a result of division using the output voltage of the at least any coil element having the sub coil portion as a denominator.

4. The position detection device, according to claim 1, wherein the detection coil comprises a plurality of detection coils that are arranged in a direction perpendicular to an extending direction of the exciting coil,
- wherein the detection target portion comprises a plurality of detection target portions that are arranged at different positions in the moving direction corresponding respectively to the plurality of detection coils, and
- wherein the detection range of each of the plurality of detection coils is offset in the moving direction of the moving member.

5. The position detection device, according to claim 4, wherein the calculation unit performs, for each of the plurality of detection coils, division with an output voltage of the at least any coil element having the sub coil portion as a denominator, and determines the position of the moving member by an output voltage of one of the detection coils whose absolute value of a result of the division is larger than other detection coils.

6. The position detection device, according to claim 4, wherein the exciting coil and the plurality of detection coils are provided on a single substrate, and the exciting coil is provided on the substrate to surround the plurality of detection coils.

7. The position detection device, according to claim 1, further comprising:
- a conductive member attached to the moving member, wherein the detection target portion is provided on the conductive member.

\* \* \* \* \*